United States Patent [19]

Bender

[11] Patent Number: 5,498,684
[45] Date of Patent: Mar. 12, 1996

[54] SELF-GELLING BINDER RESINS FOR OFFSET-PRINTING INKS HAVING IMPROVED STORAGE STABILITY

[75] Inventor: Albert Bender, Mainz, Germany

[73] Assignee: Hoechst Aktiengesellschaft, Germany

[21] Appl. No.: 323,513

[22] Filed: Oct. 14, 1994

[30] Foreign Application Priority Data

Oct. 18, 1993 [DE] Germany ............ 43 35 426.2

[51] Int. Cl.$^6$ ............ C09F 1/04; C08G 8/34; C08G 8/32
[52] U.S. Cl. ............ 528/40; 525/54.42; 525/54.44; 106/20 R; 106/30 R; 106/228
[58] Field of Search ............ 528/40; 525/54.42, 525/54.44; 106/228, 20, 30

[56] References Cited

U.S. PATENT DOCUMENTS

| | | | |
|---|---|---|---|
| 4,079,102 | 3/1978 | Wagner et al. | 260/879 |
| 4,528,036 | 7/1985 | Rudolphy | 106/30 |
| 4,552,592 | 11/1985 | Rudolphy et al. | 106/30 |

FOREIGN PATENT DOCUMENTS

| | | |
|---|---|---|
| 0041838 | 12/1981 | European Pat. Off. . |
| 0065268 | 11/1982 | Germany . |
| 4136316 | 5/1993 | Germany . |

*Primary Examiner*—Nathan M. Nutter
*Assistant Examiner*—Richard Jones
*Attorney, Agent, or Firm*—Bierman and Muserlian

[57] ABSTRACT

An oil soluble, natural resin acid ester, modified with phenolic resin which ester is the reaction product of at least one compound of each of the following groups:

A) natural resins or natural resin acids,

B) monocyclic or polycyclic phenols which are monofunctional or polyfunctional with respect to oxo compounds, C) aldehydes or aldehyde acetals, D) aliphatic, cycloaliphatic or aromatic-aliphatic alcohols having at least two hydroxyl groups, E) $\alpha,\beta$-ethylenically unsaturated carboxylic acids or their anhydrides, F) aliphatic $C_3$–$C_{30}$ carboxylic acids or carboxylic esters having an iodine number of less than 15 g of iodine per 100 g of carboxylic acid or carboxylic ester, H) magnesium compounds, and optionally further compounds from the group of substances consisting of G) ethylenically unsaturated hydrocarbon resins, which ester is prepared by reacting the components at a temperature in the range from 100° to 300° C. with continuous azetropic distillation of the water of reaction using an entraining agent useful as a binder in printing ink for off-set and letter press printing since after storage for at least three months as a solid in air, still forms a non-turbid, self-gelling solution in mineral oil (boiling range 240° to 270° C., aniline point 72° C.).

6 Claims, No Drawings

SELF-GELLING BINDER RESINS FOR OFFSET-PRINTING INKS HAVING IMPROVED STORAGE STABILITY

The invention relates to oil-soluble natural resin acid esters which are modified with carboxylic acids or their esters and phenolic resins, form self-gelling solutions in mineral oil and linseed oil, and possess improved storage stability, as well as to processes for their preparation from natural resins, phenols, aldehydes, carboxylic acids or their esters, magnesium compounds, esterifying agents and modifiers, and to their use as binder resins for offset-printing inks.

It is already known to prepare self-gelling binder resins for offset-printing inks from mixtures of natural resins and their reaction products with α,β-olefinically unsaturated carboxylic acids or their anhydrides, monocyclic or polycyclic phenols, aldehydes or aldehyde acetals, and polyfunctional alcohols, with or without fatty acid compounds and ethylenically unsaturated hydrocarbon resins. Imperatives for the success of this reaction are the use of magnesium compounds to catalyze the polycondensation reaction, and the azeotropic removal of the water of reaction formed (EP-A 0 548 506).

It is particularly advantageous for the components used to include vegetable oils, since in this case the products possess low melt viscosities with the result that their handling is made easier. The oils used in this context are semi-drying and drying oils having an iodine number of from 50 to 150 g of iodine per 100 g of oil. Products which have been described are, for example, those with unsaturated soybean oil as fatty acid compound. However, the resins prepared therewith have the grave disadvantage that they do not remain stable on storage when exposed to air. After eight weeks at most they have already changed so much by ageing that they do not dissolve completely either in mineral oil or in linseed oil, and that the gel structure of the solutions is then weakened or completely nonexistent. This makes their use in practice more difficult or even totally impossible.

The object of the present invention was therefore to provide self-gelling synthetic resins which remain stable even on prolonged storage with exposure to air and which then dissolve in mineral oil and vegetable oil while retaining the gel structure.

It has now surprisingly been found that synthetic resins possessing these properties can be obtained by including, in the condensation reaction for the known preparation of self-gelling binder resins for offset-printing inks, $C_1$–$C_{80}$ carboxylic acids or their esters having an iodine number of below 50 g of iodine per 100 g of carboxylic acid or carboxylic ester.

The invention therefore relates to oil-soluble, natural resin acid esters, modified using phenolic resin, which after storage for at least 3 months as solids exposed to air still form nonturbid self-gelling solutions in mineral oil (boiling range 240° to 270° C., aniline point 72° C.), which esters can be prepared by reacting at least one compound from each of the groups of substances consisting of A) natural resins or natural resin acids, B) monocyclic or polycyclic phenols which are monofunctional or polyfunctional with respect to oxo compounds, C) aldehydes or aldehyde acetals, D) aliphatic, cycloaliphatic or aromatic-aliphatic alcohols having at least two hydroxyl groups, E) α,β-ethylenically unsaturated carboxylic acids or their anhydrides, and F) $C_1$–$C_{80}$ carboxylic acids or carboxylic esters having an iodine number of less than 50 g of iodine per 100 g of carboxylic acid or carboxylic ester and, if desired, further compounds from the group of substances consisting of G) ethylenically unsaturated hydrocarbon resins in the presence of H) magnesium compounds at a temperature in the range from 100° to 300° C., with continuous azeotropic distillation of the water of reaction using an entraining agent.

The compounds preferably used from the groups of substances A) to H) are:

A) natural resins or natural resin acids, preferably rosin, wood rosin, tall resin and disproportionated, partially hydrogenated or dimerized natural resin of whatever origin, B) monocyclic or polycyclic phenols, preferably those which are polyfunctional with respect to oxo compounds, particularly preferably monofunctional and, in particular, bifunctional phenols in which one or two of the ortho- or para-positions to the phenolic hydroxyl group on the benzene ring are reactive and capable of aldehyde addition, for example phenol, $(C_1$–$C_{12})$-alkylphenols, arylphenols or aralkylphenols, cresols, 1,3,5-xylenols, isopropylphenol, p-tert-butylphenol, amylphenol, octylphenol and nonylphenol, diphenylolpropane, phenylphenol, cumylphenol and addition products of phenols with ethylenically unsaturated monomers, preferably styrene, α-methylstyrene, α-chlorostyrene, vinyltoluene and cyclopentadiene, C) aldehydes or aldehyde acetals, preferably aliphatic $C_1$–$C_7$ aldehydes, especially formaldehyde in its various monomeric, oligomeric and polymeric forms, acetaldehyde, butyraldehyde and isobutyraldehyde, and also benzaldehyde, furfural and glyoxal, D) esterifying agents containing at least two hydroxyl groups, for esterifying the reaction products of phenolic resins and natural resins or natural resin acids, preferably polyfunctional aliphatic alcohols, especially bifunctional alcohols, for example glycols, or trifunctional alcohols, for example trimethylolethane, trimethylolpropane and glycerol, or tetrafunctional alcohols, for example pentaerythritol, or pentafunctional alcohols, for example dimerized trimethylolpropane, or hexafunctional alcohols, for example dimerized pentaerythritol, particularly preferably glycerol, trimethylolpropane and pentaerythritol, E) α,β-unsaturated carboxylic acids or their anhydrides, preferably aliphatic carboxylic acids of 3 to 22 carbon atoms, especially fumaric acid, maleic acid, maleic anhydride, itaconic acid, cinnamic acid and acrylic acid, particularly preferably maleic anhydride, F) $C_1$–$C_{80}$ carboxylic acids or their esters having an iodine number of less than 50 g of iodine per 100 g of carboxylic acid or carboxylic ester, preferably $C_3$–$C_{30}$ carboxylic acids, for example butyric acid, isononanoic acid, dodecanoic acid, Versatic acid, hydroxystearic acid, especially monomeric, dimeric and trimeric fatty acids which may also be completely or partially hydrogenated, or carboxylic esters such as, for example, the ethyl esters or glycerol esters of the abovementioned acids, coconut oil, copra butter or hydrogenated copra butter, palm kernel oil, dika butter, chinese tallow, Japan wax or epoxidized soybean oil, particularly preferably carboxylic esters having an iodine number of below 30 g, especially below 15 g, of iodine, per 100 g of carboxylic ester, for example the esters of saturated fatty acids with polyhydric alcohols, especially with glycerol, with hydrogenated copra butter being very particularly preferred, G) ethylenically unsaturated hydrocarbon resins for resin modification, preferably polymers or oligomers of ethylenically mono- and/or polyunsaturated $C_5$–$C_9$ hydrocarbons, especially those from the group consisting of isoprene, cyclopentadiene, indene, coumarone and styrene, or copolymers of ethylenically unsaturated hydrocarbon resins with compounds from the group of substances A), and H) magnesium compounds, preferably oxides and hydroxides or salts of organic acids, especially carbonates, bicarbonates, acetates, formates and oxalates.

The invention also relates to the preparation of oil-soluble, natural resin acid esters, modified with phenolic resins, by reacting components A) to H). In this context the proportion of the individual components, based on the overall quantity of components A) to H) employed, is from 20 to 80% by weight, preferably from 30 to 75% by weight and in particular from 35 to 60% by weight, of natural resins or natural resin acids from the group of substances A), from 1 to 45% by weight, preferably from 15 to 40% by weight and in particular from 20 to 35% by weight, of phenolic components from the group of substances B), and from 1 to 20% by weight, preferably from 3 to 10% by weight and in particular from 5 to 8% by weight, of aldehydes or aldehyde acetals from the group of substances C), with a molar ratio of phenol component B) to aldehyde component C) which is preferably in the range from 1:0.9 to 1:4.5, in particular from 1:1 to 1:2.5, if desired replacing the aldehyde or phenol components from the groups of substances B) and C), totally or partially, with—preferably up to 65% by weight—of condensation products in phenolic resol or Novolak form which have been prepared separately from compounds of the groups of substances B) and C), from 1 to 20% by weight, preferably from 3 to 15% by weight and in particular from 4 to 10% by weight, of polyol components from the group of substances D), from 0.1 to 10% by weight, based on the natural resin or natural resin acid employed, of α,β- ethylenically unsaturated carboxylic acids or their anhydrides, from the group of substances E), from 0.1 to 30% by weight, preferably from 3 to 15% by weight and in particular from 5 to 10% by weight, of $C_1$–$C_{80}$ carboxylic acids or carboxylic esters from the group of substances F), from 0 to 30% by weight, preferably from 1 to 25% by weight and in particular from 2 to 10% by weight, of hydrocarbon resin components from the group of substances G), and from 0.01 to 5% by weight, preferably from 0.3 to 3% by weight and in particular from 0.4 to 0.8% by weight, calculated as MgO, of magnesium compounds from the group of substances H).

For the azeotropic distillation of the water of reaction which is formed, from 0.01 to 20% by weight, preferably from 0.1 to 5% by weight, based on the overall quantity of components A) to H), of an inert entraining agent are added.

The inert entraining agents employed are preferably saturated, aliphatic or aromatic hydrocarbons with boiling points at atmospheric pressure of below 100° C., for example alkanes and especially hexane or decane, mixtures of aliphatic hydrocarbons, for example petroleum spirit or corresponding mineral oil fractions, with toluene or xylene being further preferences.

The components are reacted in solution or, preferably, in bulk at temperatures in the range from 100° to 300° C., preferably from 110° to 280° C. and in particular from 140° to 260° C. For this purpose either the total mixture of all the components employed is reacted, or individual components are introduced initially and the remaining components are metered in for the reaction. The reaction is advantageously carried out such that natural resins or natural resin acids from the group of substances A) are reacted with α,β-ethylenically unsaturated carboxylic acids or their anhydrides from the group of substances E) in the temperature range from preferably 130° to 190° C. and are then mixed with phenolic components from the group of substances B), aldehyde components from the group of substances C), or with a condensation product which completely or partially replaces the phenol and aldehyde and is prepared separately by known methods from phenols and aldehydes in the presence of basic catalysts at a temperature of from 50° to 160° C., preferably from 60° to 100° C., at atmospheric pressure or increased pressure, and with polyol components from the group of substances D), $C_1$–$C_{80}$ carboxylic acids or carboxylic esters from the group of substances F), and, if desired, hydrocarbon resin components from the group of substances G), and with a magnesium compound from the group of substances H), and reacting this mixture initially at a temperature of from 100° to 160° C., preferably from 110° to 160° C., preferably under a pressure of between 1 and 10 bar, in particular between 1 and 5 bar. If a separately prepared phenol-formaldehyde condensation product is used, then atmospheric pressure can be employed.

If the condensation product of phenol component B) and aldehyde component C) is prepared in situ, a reaction procedure which differs from the process above is particularly preferred since it allows higher aldehyde conversions to be achieved. In this procedure the first step is to react natural resins or natural resin acids from the group of substances A), phenolic components from the group of substances B), aldehyde components from the group of substances C), magnesium compounds from the group of substances H) and, if desired, hydrocarbon resin components from the group of substances G) at a temperature of from 100° to 260° C., preferably from 110° to 160° C., and at a pressure of from 1 to 10 bar, preferably from 1.5 to 5 bar. The resulting mixture is then reacted with α,β-ethylenically unsaturated carboxylic acids or their anhydrides from the group of substances E) in the temperature range between 100° and 250° C., preferably from 160° to 200° C. Subsequently the polyol component from the group of substances D) is added. In this procedure the carboxylic acid components from the group of substances F) can be used at any point in the reaction sequence, for example right at the beginning of the reaction or, alternatively, not until after addition of the alcohol.

The reaction mixture is then heated to a temperature of between 190° and 300° C., preferably from 230° to 260° C., and an inert organic solvent which is able to act as an entraining agent for the azeotropic distillation of water at the reaction temperature is added to the reaction mixture. In this case the water of reaction formed is continuously removed from the reaction mixture by azeotropic distillation. The entraining agent is preferably circulated via a water separator. Azeotropic distillation is continued until the formation of water of reaction has come to an end, and the resulting resin has an acid number of below 50 mg of KOH/g of resin, preferably below 30 mg of KOH/g of resin. The entraining agent is then removed by distillation, starting at atmospheric pressure and finishing under vacuum at a pressure between 1,000 and 0.1 mbar, preferably between 200 and 50 mbar, and at a temperature of up to 300° C., preferably up to 280° C., the reaction mixture is cooled to room temperature, and the natural resin acid ester modified with phenolic resin is obtained, preferably as solid resin.

In the synthetic process of the invention the progress of the condensation reaction is advantageously monitored on the basis of the acid number of the reaction mixture. For instance, the acid number of the resin mixture, determined by the conventional methods, may initially and preferably be up to 200 mg of KOH per g of resin. As the reaction progresses and water is eliminated and removed azeotropically, the acid number falls progressively and the esterification reaction is continued until the reaction of the invention has reached the desired, end stage and the acid number has fallen to values of below 50 mg, preferably less than 30 mg, of KOH per g of resin. After this the entraining agent is removed from the reaction mixture by distillation, under vacuum in the final stages. In many cases it may also be advantageous to leave some or all of the entraining agent in the end product, provided it dissolves without problems in the end product and does not interfere with or impair the further use of this product. Leaving the entraining agent is preferable in the case of high molecular weight resins with a high melting point, whose processability may be considerably improved by such a measure, since its melt viscosity and melting point are lowered and it is thereby enabled to dissolve more rapidly in mineral oil. On the other hand it is also possible to add mineral oil to the resin melt subsequently. This covers all possibilities from a solid resin via a liquid resin-mineral oil varnish to a solution. It is also possible to add further compounds during, or preferably, after the actual reaction, preferably with the purpose of optimizing the compatibility. Examples of suitable compounds are monomers or oligomers, such as rosin, rosin esters, styrene or polymers such as phenolic resins, alkyd resins, polyesters, polystyrene, or mixtures thereof.

Since natural resins of different origin may differ in composition, the resulting product properties may also be different with respect, for example, to viscosity. The formulation can then, however, be adapted to the particular natural resin by slight changes in the concentration of the individual components.

The molecular weight of the resins according to the invention can be determined by known methods, by gel permeation chromatography of the resin solutions in tetrahydrofuran (THF) on polystyrene foam in a permeation measuring apparatus. The average molecular weight (weight average $M_w$) of the resins according to the invention as determined from the results obtained from these measurements is preferably above 5,000 with no critical upper limit. However, the average molecular weight $M_w$ is particularly preferably within a range of between 5,000 and 100,000, in particular between 8,000 and 50,000.

The resins according to the invention have a compatibility in mineral oil which is preferably good. To determine the mineral oil compatibility, or the clarity of solubility in mineral oil, of the resins according to the invention each of these resins is dissolved at 180° C. in standardized mineral oil (boiling range 240° to 270° C., aniline point 72° C.) to give 40% by weight, clear resin solutions, the solutions are cooled to 23° C. and are then titrated with the same mineral oil, while stirring, until turbidity appears (cloud point). The ratio of 1 part by weight of resin to x parts by weight of mineral oil in the solution at cloud point is taken as the compatibility or full-solubility endpoint. Preferably the resins exhibit no turbidity or separation in the range of from 1 part by weight of resin to from 3 to 5 parts by weight of mineral oil. When using mineral oils other than the standardized test oil used in this case (®Mineralöl PKW F 4/7 from Haltermann, boiling range 240° to 270° C., aniline point 72° C.) the numerical values found for the mineral oil compatibility may be different.

To determine the viscoelasticity, which is a measure of the gel structure, the phenolic resin-modified natural resin acid esters according to the invention, which are self-gelling in mineral oil, are first converted to gels by mixing them with the above-described mineral oil as test oil over the course of 30 minutes at 180° C., in a weight ratio of resin to mineral oil of 1:1.5, cooling the mixtures to room temperature to form a gel from the 40% by weight resin solution in mineral oil, and determining the loss factor (tan$\delta$) of the gel in an oscillating rotary viscometer (model RV 20/CV 100 from Haake with the PK 20 measuring device) at 23° C. with a deflection angle of 10° and a frequency sweep of from 0.05 to 5 Hz. The values measured within the angular velocity range from 1 to 10 s$^{-1}$ are below 3, preferably below 2 and in particular below 1.5. When mineral oils other than the test oil used here, or different measurement conditions, are employed, the tan$\delta$ values measured may vary slightly.

To determine the storage stability the resin is mechanically comminuted to pea size and stored on a plate in air. The ease with which the resin dissolves in mineral oil and the resulting gel thickness are then determined, as a function of the storage time, by the method indicated above. The oil-soluble, phenolic resin-modified, natural resin acid esters according to the invention form nonturbid, self-gelling solutions with the abovementioned loss factors after storage as solids in air for at least 3 months, preferably at least 6 months and in particular at least 8 months.

The invention furthermore relates to the use of the resins of the invention as binder resins, preferably in printing inks for offset printing and letterpress printing, in which they can be employed very advantageously, especially in gel form as gel varnishes.

The examples below illustrate the invention in more detail. In the examples the parts and percentages given are by weight unless otherwise stated.

COMPARATIVE EXAMPLE 1

A binder resin is prepared by known methods, according to Example 2 of DE-A-41 36 316.

In a heatable 2 l multinecked flask with stirrer mechanism, thermometer, dropping funnel, reflux condenser and filling pipe, under a nitrogen atmosphere, 527 g of commercially available rosin, which is also called natural resin or natural resin acid, are melted, and 28.3 g of maleic anhydride are metered in to the resin melt which is at a temperature of 160° C. After the ensuing exothermic reaction has subsided, the reaction mixture is maintained at 160° C. for 1 hour more. Then 308 g of nonylphenol, 111 g of soybean oil (iodine number 130 g of iodine/100 g of oil), 74.2 g of pentaerythritol and 6.4 g of magnesium oxide suspended in 30 ml of xylene are added dropwise to the mixture at 160° C., the temperature is lowered to 110° C., 78 g of paraformaldehyde are added, and the mixture is stirred at 110° C. for 1 hour. After this the temperature is increased to 130° C. over the course of 20 minutes, and the phenolic resol begins to form with elimination water. The reaction temperature is maintained at 130° C. for a further 2 hours after which the reflux condenser is combined with an azeotropic water separator, the latter is filled with xylene, the water formed in the condensation reaction is extracted from the reaction mixture by azeotropic distillation and removed. The temperature of reaction is then increased continuously up to 250° C. over the course of 4 hours and water continues to be removed azeotropically until no more water is formed and the reaction mixture has reached an acid number of 23 mg of KOH/g of reaction mixture. The entraining agent is then removed from the reaction mixture by distillation at the same temperature, finally applying a vacuum of 60 mbar for 30 minutes. When the vacuum distillation is complete the reaction mixture is cooled to room temperature. 962 g of solid binder resin are obtained as a vitreous solidified melt which can be powdered and has a melting point of 126° C. A solution of 1 part of resin in 5 parts of the above mineral oil is a stable, clear solution whose compatibility is therefore better than 1:5. The average molecular weight as determined by gel permeation chromatography is 48,700. The reaction time for the preparation is 16 hours. To prepare the gel the resin is dissolved over the course of 30 minutes in mineral oil with a boiling range of 240° to 270° C. and an aniline point of 72° C. at a concentration of 40% by weight. After the solution has been cooled to room temperature, a solid, stable gel is formed with a tanδ value of 1.4.

The gel formation experiment in mineral oil is repeated with the resin stored in air after 2 months. Under the dissolution conditions indicated the resin does not dissolve completely. A heterogenous mixture is obtained which, after cooling to room temperature, does not form a gel. Because of its heterogenous composition the mixture cannot be used in accordance with the invention.

EXAMPLE 1

The procedure is as in Comparative Example 1 but replacing the soybean oil (iodine number 130 g of iodine/100 g of oil) by 60 g of hydrogenated copra butter (iodine number 5 g of iodine/100 g of butter). 918 g of solid resin are obtained with a melting point of 120° C. A solution of 1 part of resin in 5 parts of the above mineral oil is a stable, clear solution whose compatibility is therefore better than 1:5. The average molecular weight as determined by gel permeation chromatography is 35,700. The reaction time for the preparation is 16 hours.

After dissolution in mineral oil under the conditions indicated in Comparative Example 1 a gel is obtained with a tanδ value of 1.5.

Even after storage for 6 months in air, the resin dissolves under the described conditions without leaving a residue to form a stable gel having a tanδ value of 1.5. The resin is very suitable for the production of offset printing inks.

EXAMPLE 2

The procedure is as in Example 1 but replacing copra butter by 50 g of isononanoic acid (iodine number 1 g of iodine/100 g of acid) and additionally using 10 g of glycerol. After a reaction period of 16 hours a resin is obtained with a melting point of 135° C., which in the above mineral oil has a compatibility of better than 1 part of resin to 5 parts of oil and forms a gel having a tanδ value of 1.5.

Even after storage for 8 months in air, the resin dissolves under the described conditions without leaving a residue to form a stable gel having a tanδ value of 1.5. The resin is very suitable for the production of offset printing inks.

EXAMPLE 3

The procedure is as in Example 1, but replacing copra butter by 57 g of stearic acid (iodine number less than 1 g of iodine/100 g of acid) and additionally using 6 g of glycerol. After a reaction period of 16 hours a resin is obtained with a melting point of 125° C., which in the above mineral oil has a compatibility of better than 1 part of resin to 5 parts of oil and forms a gel having a tanδ value of 1.6.

Even after storage for 8 months in air, the resin dissolves under the described conditions without leaving a residue to form a stable gel having a tanδ value of 1.6. The resin is very suitable for the production of offset printing inks.

EXAMPLE 4

A procedure analogous to that described in Example 1 is used to react 467 g of rosin, 60 g of a commercially available hydrocarbon resin, 28 g of maleic anhydride, 60 g of hydrogenated copra butter, 308 g of nonylphenol, 74 g of pentaerythritol, 6 g of magnesium oxide and 78 g of paraformaldehyde. 1,320 g of solid resin are obtained with a softening point of 127° C. This is dissolved in mineral oil under the conditions indicated in Comparative Example 1 to give a gel having a tanδ value of 1.3.

Even after storage for 6 months in air, the resin dissolves under the described conditions without leaving a residue to form a stable gel having a tanδ value of 1.3. The resin is very suitable for the production of offset printing inks.

EXAMPLE 5

In a heatable 2l autoclave with stirrer mechanism, 467 g of rosin are melted together with 60 g of a commercially available hydrocarbon resin. 308 g of nonylphenol, 6 g of magnesium oxide and, at 110° C., 78 g of paraformaldehyde are added to this melt. The autoclave is then sealed and brought to a temperature of 140° C. so that a pressure of 3 bar is established. After 2 hours the autoclave is let down and combined with an ascending condenser and the melt is brought to 160° C. while water is distilled off. At this temperature 28 g of maleic anhydride are added after which the melt, which has become highly viscous, is homogenized with stirring over the course of half an hour. It is then heated to 180° C., and then 74 g of pentaerythritol followed by 60 g of hydrogenated copra butter are incorporated by stirring. The reaction temperature is then raised to 250° C., and from 230° C. the water of reaction formed is distilled off via a water separator using xylene as azeotropic entraining agent. When an acid number of 23 mg of KOH/g of resin is reached the reaction is ended by distilling off the entraining agent, under a vacuum of 60 mbar for 30 minutes in the final stages, and the solid resin is isolated. It is dissolved in mineral oil under the conditions indicated in the comparative example to give a gel having a tanδ value of 1.2.

Even after storage for 6 months in air, the resin dissolves under the described conditions without leaving a residue to form a stable gel having a tanδ value of 1.2. The resin is highly suitable for the production of offset printing inks.

I claim:

1. An oil-soluble, natural resin acid ester, modified with phenolic resin, which after storage for at least three months as a solid in air, still forms a nonturbid, self-gelling solution in mineral oil (boiling range 240° to 270° C., aniline point 73° C.) which ester consists of the reaction product of at least one compound from each of the following groups A) natural resins or natural resin acids,
B) monocyclic or polycyclic phenols which are monofunctional or polyfunctional with respect to oxo compounds,
C) aldehydes or aldehyde acetals, D) aliphatic, cycloaliphatic or aromatic-aliphatic alcohols having at least two hydroxyl groups, E) α,β-ethylenically unsaturated carboxylic acids or their anhydrides, F) aliphatic $C_3$–$C_{30}$ carboxylic acids or carboxylic esters having an iodine number of less than 15 g of iodine per 100 g or carboxylic acid or carboxylic ester, H) magnesium compounds, and optionally further compounds from the group of substances consisting of G) ethylenically unsaturated hydrocarbon resins, which ester is prepared by reacting the components at a temperature in the range from 100° to 300° C. with continuous azetropic distillation of the water of reaction using an entraining agent.

2. A natural resin acid ester, modified using phenolic resin, as claimed in claim 1, wherein the resin comminuted to pea size, after a storage time of 6 months in air, after being dissolved in mineral oil (boiling range 240° to 270° C., aniline point 72° C.) and then cooled to 23° C. at a concentration of 40% by weight, forms a gel which does not exhibit turbidity or separation and which has a loss factor (tanδ) in the angular velocity range from 1 to $10^{-1}$ of below 2.

3. A process for the preparation of natural resin acid esters, modified using phenolic resin, as claimed in claim 1 consisting of reacting from 20 to 80% of natural resins or natural resin acids from the group of substances A), from 1 to 45% by weight of phenolic components from the group of substances B), and from 1 to 20% by weight of aldehydes or aldehyde acetals from the group of substances C), replacing the aldehyde or phenol components from the groups of substances B) and C), completely or partially, with up to 65% by weight of condensation products prepared separately from compounds of the groups of substances B) and C) from 1 to 20% by weight of polyol components from the group of substances D), from 1 to 10% by weight of α,β-ethylenically unsaturated carboxylic acids or their anhydrides from the group of substances E), from 0.1 to 30% by weight of $C_1$–$C_{80}$ carboxylic acids or carboxylic esters from the group of substances F), from 0 to 30% by weight of hydrocarbon resin components from the group of substances G), and from 0.01 to 5% by weight, calculated as MgO, of magnesium compounds from the group of substances H), together with from 0.01 to 20% by weight of an inert entraining agent, based in each case on the overall quantity of components A) to H).

4. The process for the preparation of natural resin acid esters, modified using phenolic resin, as claimed in claim 3, the component F) being selected from the group consisting of coconut oil, copra butter and hydrogenated copra butter.

5. The process for the preparation of natural resin acid esters, modified using phenolic resin, as claimed in claim 3, wherein initially at least one compound from each of the groups of substances A), B), C), H) and, optionally G) are reacted with one another at a temperature of from 100° to 250° C. and at a pressure of from 1 to 10 bar, a compound from the group of substances E) is added to the reaction mixture in the temperature range from 100° to 250° C., and then a compound from the group of substances D) is added, and, in addition, a compound of the group of substances F) is employed at any desired point in the reaction sequence and the water of reaction is removed continuously under azeotropic distillation using an entraining agent at a reaction temperature of from 230° C. to 260° C.

6. A printing ink for offset and letter press printing containing resin acid ester of claim 1 as a binder.

\* \* \* \* \*